United States Patent [19]
Kernon et al.

[11] Patent Number: 5,224,819
[45] Date of Patent: Jul. 6, 1993

[54] COOLING AIR PICK UP

[75] Inventors: John D. Kernon, Clevedon; Kenneth R. Langley, Gloucestershire, both of Great Britain

[73] Assignee: Rolls-Royce plc, London, England

[21] Appl. No.: 810,148

[22] Filed: Dec. 19, 1991

[30] Foreign Application Priority Data

Dec. 19, 1990 [GB] United Kingdom ............ 90275413

[51] Int. Cl.⁵ ............................................. F01D 5/14
[52] U.S. Cl. ................................. 415/115; 415/116; 415/914
[58] Field of Search .................... 415/115, 116, 914

[56] References Cited

U.S. PATENT DOCUMENTS

| | | |
|---|---|---|
| 1,829,674 | 10/1931 | Rosenlocher ............ 415/115 |
| 2,501,614 | 3/1950 | Price ...................... 415/115 |
| 2,859,910 | 11/1958 | Stalker .................... 415/115 |
| 2,944,729 | 7/1960 | Foley et al. .............. 415/115 |
| 3,031,132 | 4/1962 | Davies ..................... 415/115 |
| 3,291,447 | 12/1966 | Brandon ................... 415/111 |
| 3,694,102 | 9/1972 | Conrad ..................... 415/115 |
| 3,720,045 | 3/1973 | Murphy ..................... 415/115 |
| 3,742,706 | 7/1973 | Klompas ................... 415/115 |

Primary Examiner—John T. Kwon
Attorney, Agent, or Firm—Oliff & Berridge

[57] ABSTRACT

A cooling air pick up for use in a gas turbine engine includes a cooling air duct incorporating a diffuser to maximize the cooling air pressure. The entry orifice of the pick up duct is formed in the leading edge of a flow vane in the interior of a flow passage downstream of the engine compressor section.

3 Claims, 2 Drawing Sheets

COOLING AIR PICK UP

BACKGROUND OF THE INVENTION

This invention relates to a cooling air pick up device for use in a gas turbine engine.

In a gas turbine engine it is common practice to cool engine components exposed to very high temperature gas flows such as the turbine blades and turbine stator vanes. This cooling generally uses air to cool the components either by transferring heat energy from the component to air passing through it or shielding the components from the hot gas by generating a thin barrier layer of cooling air across the surface of the component. Often the two techniques are combined by cooling air passing through a component and then being ejected from the component through a number of apertures to generate a film or barrier layer of air over the component surface.

In order for film cooling to be useful it is clearly necessary for the pressure of the cooling air to be higher than the ambient pressure in the hot gas flow around the component. Additionally it is convenient to exhaust expended cooling air into the gas flow through the engine rather than provide further ducting to carry it away. This also requires that cooling air pressure is higher than the stream pressure in the hot gas flow around the component.

Generally cooling air is tapped off from the compressed airflow exiting the compressor or compressors because this is the highest pressure cool air available within the engine. This tapping off is carried out by a cooling air pick up.

It has been found in some engine designs that higher pressure cooling air is desirable. This can be obtained by further pressurising the cooling air using a dedicated compressor driven by the gas turbine engine. This is undesirable because it increases the cost, weight and complexity of the engine, and adds a serious safety problem should this compressor fail. Vital engine parts will then at best be uncooled and at worst have hot gas flowing into and through them due to pressure driven reverse flow in the cooling air system. Either event will usually result in the rapid destruction of the component. Additionally there will be some power losses involved in driving such a compressor, reducing the net power output of the gas turbine engine.

Additionally, in a multi-compressor engine where the compressors are arranged in series it is desirable to obtain cooling air from the output of the earliest possible compressor in the series in order to minimise the amount of work done by the engine compressing its cooling air. However, it is generally necessary to take cooling air for the guide vanes and turbine blades immediately downstream of the combustion region from the output of the last compressor in the series because of the relatively high gas pressure in this region.

SUMMARY OF THE INVENTION

This invention was intended to provide a cooling air system at least partially overcoming these problems.

In its broadest sense this invention provides a cooling air pick up for use in a gas turbine engine which carries air away from the main air flow through the engine using a pick up incorporating a diffuser.

This invention provides a cooling air pick up for a gas turbine engine including an air passage and a cooling air duct arranged to carry a proportion of the air in the passage away and forming a diffuser.

This allows the static pressure of the cooling air to be increased in the duct so as to provide the maximum possible pressure head to drive cooling air through the engine cooling system.

Also, this increase in static pressure can allow air from the output of an earlier series compressor in a multi-compressor engine to be used than would otherwise be the case.

Although the main airflow through the engine is passed along diffusion ducts to increase its pressure after exiting the compressor it is generally not diffused to the maximum possible static pressure because this is generally not desirable if maximum engine efficiency is to be achieved. As a result it is generally possible to obtain cooling air at a higher pressure than the main airflow through the engine by passing the cooling air through a separate diffuser whether the cooling air is taken from upstream or downstream of the main airflow diffuser.

BRIEF DESCRIPTION OF THE DRAWINGS

A cooling air pick up embodying the invention will now be described, by way of example only with reference to the accompanying diagrammatic figures, in which:

Referring to FIG. 1 a gas turbine engine 1 is shown. The engine 1 comprises an air intake 2, a compressor section 3, a fuel burning section 4, a turbine section 5 and an exhaust jet pipe 6 in gas flow series. In operation the stator vanes and rotor blades and some other components within the turbine section 5 are cooled by cooling air taken from the downstream, that is the highest pressure, end of the compressor stage 3.

The general operating principles of gas turbine engines are very well known, and need not be discussed here.

Figure 1:
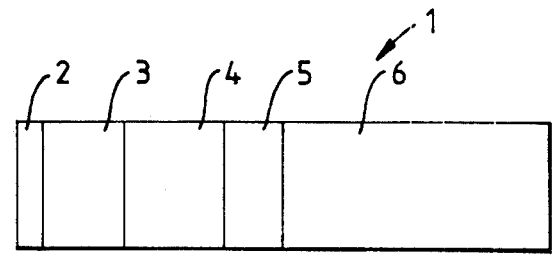
FIG. 1 shows a general view of a gas turbine engine.
Figure 2:
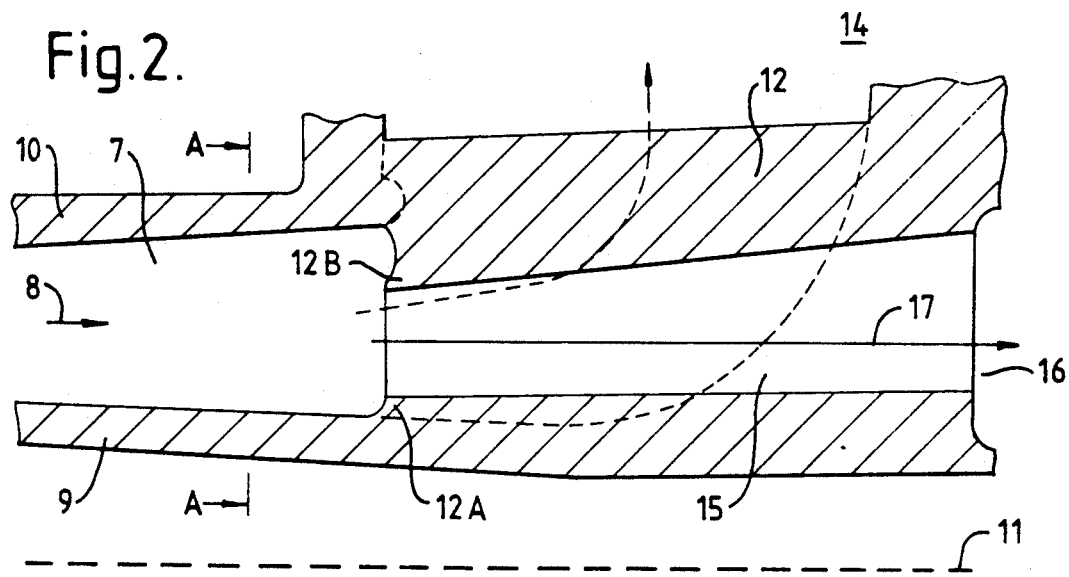
FIG. 2 shows a cross section through a cooling air pick up in the engine of FIG. 1.
Figure 3:
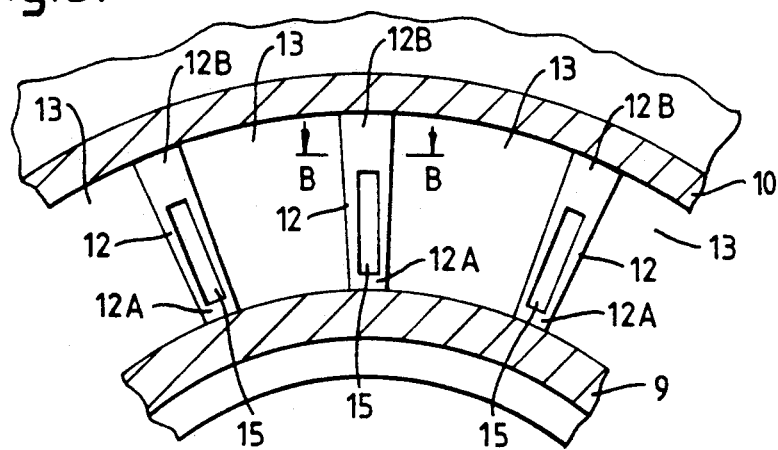
FIG. 3 shows a cross section along the line A—A in FIG. 2.
Figure 4:
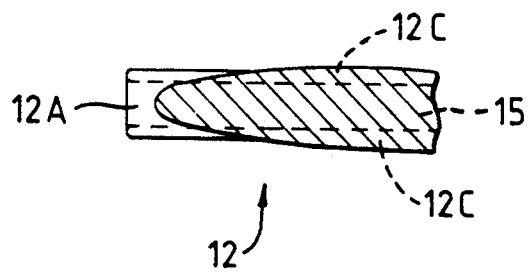
FIG. 4 shows a cross section along the line B—B in FIG. 3.

Referring to FIGS. 2, 3 and 4 a part of a cross section of the engine in the region where air leaves the compressor section 3 and enters the fuel burning section 4 is shown.

Air from the compressor section 3 moves along a diffusion duct 7 in the direction of the arrow 8. The diffusion duct 7 is a tapered cylindrical annulus bounded by a concentric inner wall 9 and an outer wall 10. The inner and outer walls 9 and 10 tubes coaxial about an axis 11. The space bounded by the inner wall 9 contains a shaft linking the compressor section 3 to the turbine section 5, but is omitted from the drawing for clarity.

The annular flow passage defined by inner wall 9 and outer wall 10 is bridged by a plurality of radial vanes 12. The vanes 12 and inner wall 9 are supported by the outer wall 10 which is, in turn, supported by the structural casing of the engine. The structural casing is not shown, but lies radially outward from the outer wall 10. The plurality of vanes 12 divide the annular flow duct into a plurality of segmented passages 13 between adjacent vanes. These air passages 13 supply the compressor output to the combustors. The vanes 12 ensure that swirl inherent in the compressor airflow is removed before entering the combustors.

In the region of the vanes 12 the annular compressor airflow duct curves radially outwards taking the airflow passages 13 towards combustors in a fuel burning region 14.

Cooling air is bled from the compressor output diffusion duct 7 by cooling air ducts 15 which carry the air to a plenum chamber 16, as shown by the solid arrow 17 in FIG. 2. Cooling air is carried to regions where cooling is required. The cooling air ducts 15 also acts as diffusers in order to maximise static pressure of the cooling air head within the plenum chamber 16.

Entry to the duct 15 is through a forward facing orifice in the leading edge of vane 12. Said orifice is the smaller end of the tapered diffussion duct 15 and faces into the flow exiting the high pressure compressor along duct 7 in the direction of arrow 8. In this way the dynamic pressure head of the airflow is also converted into static pressure by diffuser 15.

As previously mentioned the compressor output flow duct 7 is annular in shape; and is divided into a plurality of segments by a plurality of radial vanes 12. The cooling air pick up function may be serviced by any number of these vanes but, preferably, by more than one. To avoid circumferential pressure variation it is preferred to bleed cooling air through several vanes distributed symmetrically about the flow annulus. It is not necessary to employ every vane but that may be the case so that all vanes can be made identical.

Each vane 12 comprises an inner solid portion 12A adjacent the inner wall 9 and an outer solid portion 12B adjacent the outer wall 10 with a pair of walls 12C extending between them, the four elements 12A, 12B and 12C defining between them the duct 15. The walls 12C are parallel and the solid portions 12A and 12B get further apart as they down go downstream along the duct 15 thus increasing the cross sectional area of the duct 15 and allowing it to act as a diffuser.

The upstream edges of the solid portions 12A and 12B are tapered to reduce drag effects on the airflow along the ducts 15 and the passages 13.

As shown as well in FIG. 4 the walls at the margin of the vane diffuser entry orifice are projected forward slightly to stand-out through the boundary layer of air into the flowing airstream.

Figure 5:
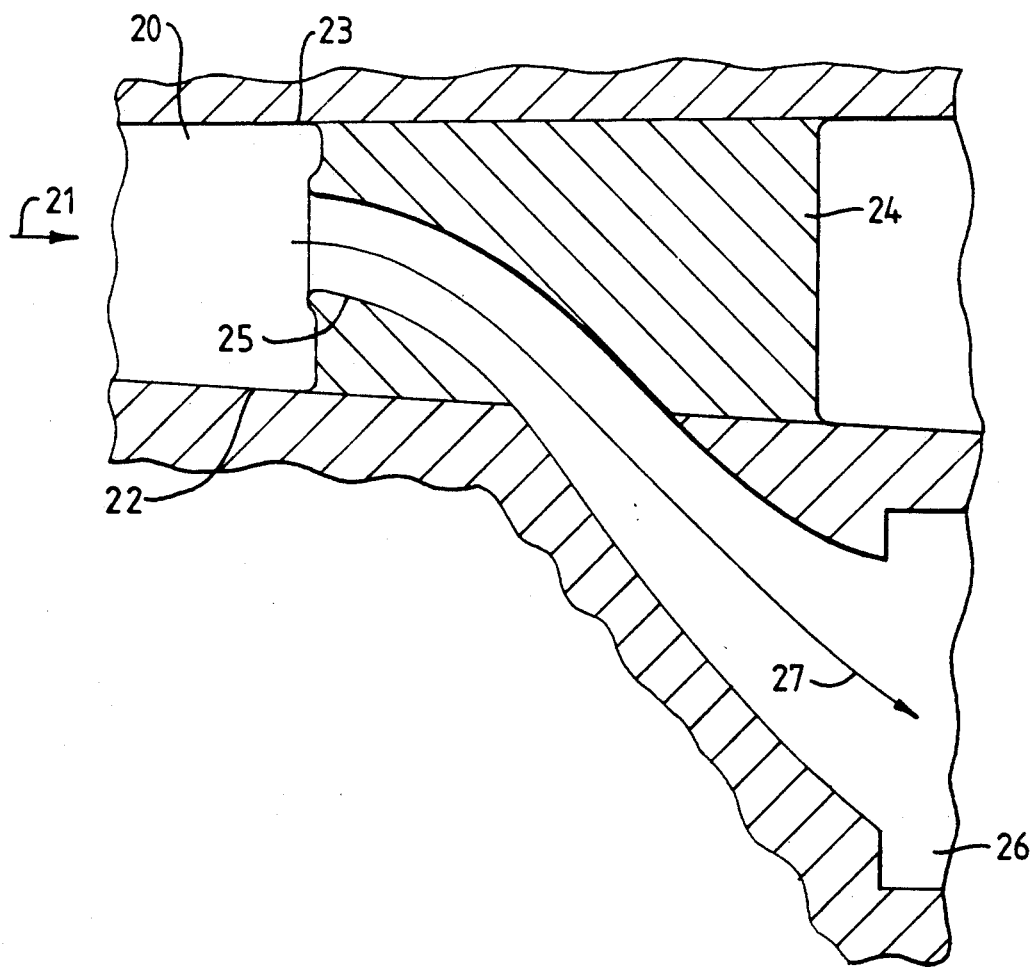
FIG. 5 shows a cross section through an alternative design of cooling air pick up, similar parts having the same reference numerals throughout.

Referring to FIG. 5 a cross section through a gas turbine engine in the region downstream of a compressor is shown.

In this engine air from the compressor moves along a diffusion duct 20 in the direction of the arrow 21. The diffusion duct is bounded by an inner wall 22 and an outer wall 23.

The inner wall 22 is connected to the outer wall 23 by a plurality of vanes 24 extending across the diffusion duct 20. The vanes 24 define air passages between them.

Cooling air is picked up by cooling air ducts 25 which carry cooling air to a plenum chamber 26, as shown by the solid arrow 27, from which the cooling air is carried to regions where cooling is required.

The cooling air ducts 25 open out in the centre of the diffusion duct 20 because this is where the air flowing along the diffusion duct 20 is coolest. Generally the air flowing near to the walls 22 and 23 will be hotter than it will be in the centre of the duct 20 and it is clearly desirable for cooling air to be as cool as possible.

The diffusion duct 20 is straight, so the cooling air duct 25 is curved to carry the cooling air out of the region occupied by the diffusion duct 20. As well as being curved the cooling air ducts 25 are also diffusion ducts so as to give the maximum static pressure to the cooling air within the plenum chamber 26.

The vanes 24 are similar to the previously described vanes 12, comprising inner and outer solid portions 24A and 24B with a pair of walls 24C extending between them, the portions and walls 24A,24B and 24C defining the cooling air passage 25 between them.

The number of vanes and their thickness varies from engine design to engine design, as does the volume of cooling air required, as a result the required size of the cooling air ducts relative to the vanes will vary from engine design to engine design.

It is not essential that all the vanes include cooling air ducts.

In the first example shown the main air passages curve outward while the cooling air ducts continue parallel to the engine axis, this geometry a product of the design of the rest of the engine, and is not generally essential. It would be equally possible to have the main air passages parallel to the axis and the ducts curved or slanting or both the ducts and passages curved.

We claim:

1. A cooling air pick-up arrangement for a turbine cooling air system in a gas turbine engine, comprising:
   a plurality of guide vanes spaced apart around an annular diffuser outlet duct of a compressor section of the engine, at least some of the plurality of guide vanes having leading edges formed with a leading edge opening facing forward into a direction of gas flow in the diffuser outlet duct; and
   a further duct connecting each of the leading edge openings with a plenum chamber from which cooling air for a turbine section of the engine is drawn, said further ducts being in the form of diffuser ducts of progressively increasing cross-sectional areas which lead directly from the forward facing leading edge openings to enable recovery of a dynamic pressure head as well as a static pressure head of air bled through said leading edge openings.

2. A cooling air pick-up system as claimed in claim 1, wherein the at least some guide vanes having leading edge openings are formed with a forwardly projecting margin around each leading edge opening which protrudes through a surface boundary layer of each guide vane.

3. A gas turbine engine provided with an internal air cooling system includes:
   a compressor section having an annular diffuser outlet duct;
   a turbine section having an internal air cooling system;
   a plenum chamber from which cooling air for the turbine section of the engine is drawn to supply air to said cooling system;
   a cooling air pick-up arrangement consisting of a plurality of hollow guide vanes spaced apart around the diffuser outlet duct, in which at least some of the guide vanes have leading edges formed with a leading edge opening facing forward into a direction of gas flow in the diffuser outlet duct; and
   a further duct connecting each of the leading edge openings with the plenum chamber, said further ducts being in the form of diffuser ducts which lead directly from the forward facing leading edge openings to enable recovery of a dynamic pressure head as well as a static pressure head of air inducted through the leading edge openings and said further ducts into the plenum chamber.

* * * * *